June 2, 1931.  G. O. DOUGHERTY  1,807,900
FLUID FLOW CONTROL FIXTURE
Filed July 18, 1927  2 Sheets-Sheet 2
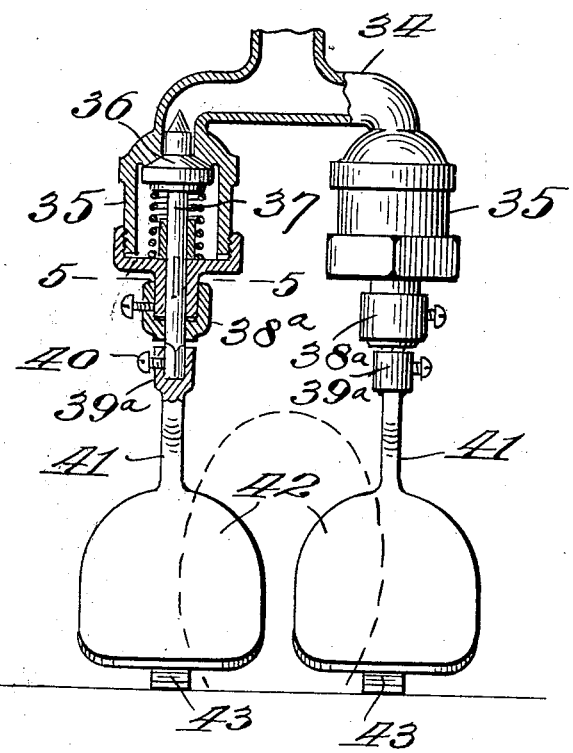
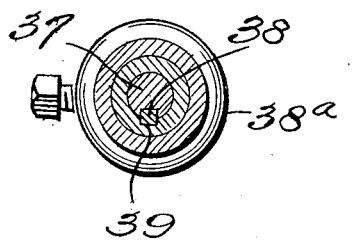
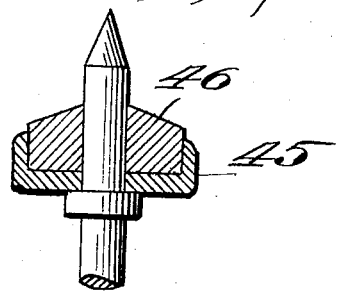
INVENTOR,
Glenn O. Dougherty.
By Martin P. Smith, atty.

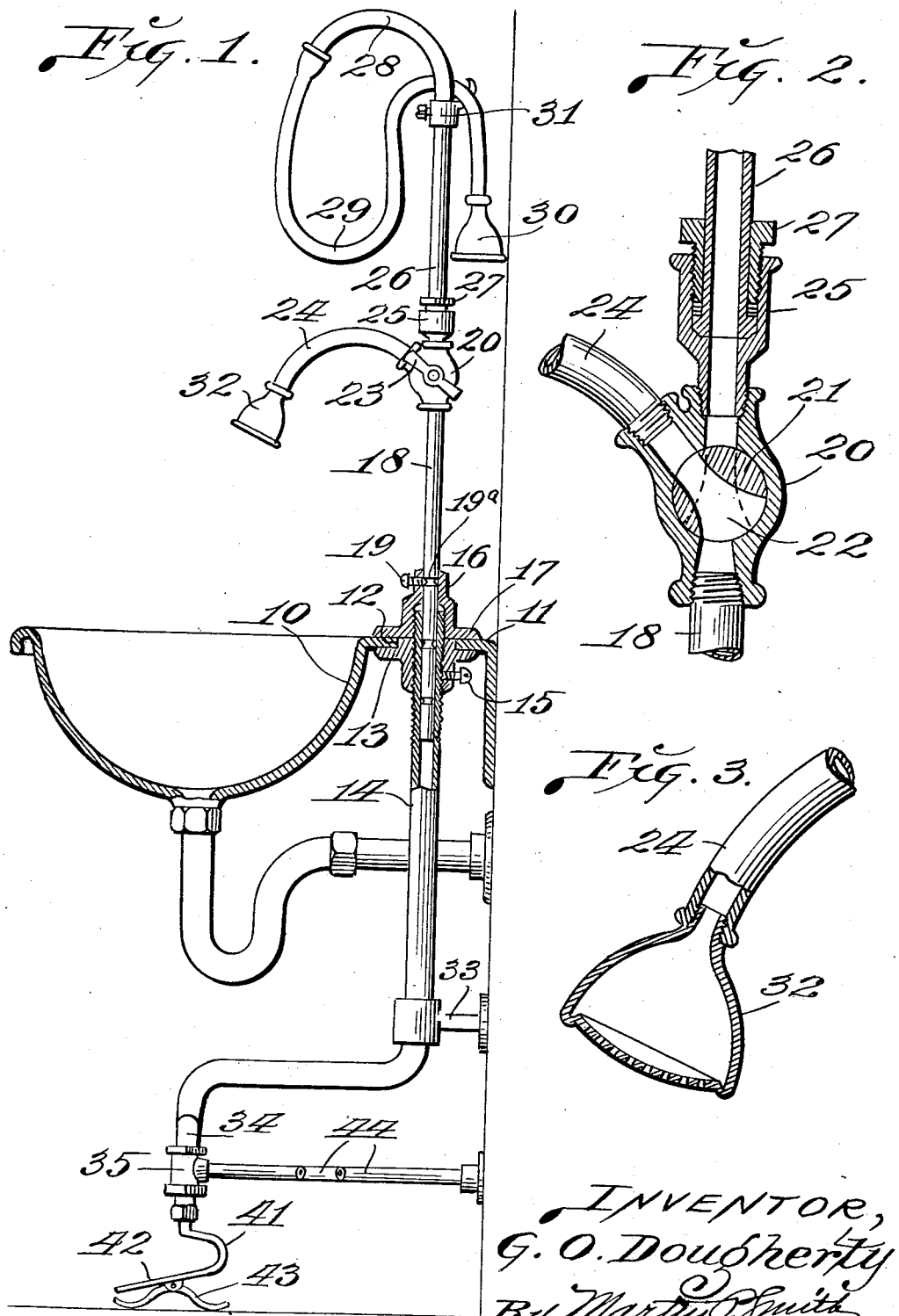

Patented June 2, 1931

1,807,900

UNITED STATES PATENT OFFICE

GLENN O. DOUGHERTY, OF LOS ANGELES, CALIFORNIA

FLUID FLOW CONTROL FIXTURE

Application filed July 18, 1927. Serial No. 206,510.

My invention relates to a fixture that is especially designed for use in connection with wash bowls, sinks, laundry trays, drinking fountains, soap fountains, and the like, and the principal object of my invention is to provide a fixture of the character referred to that is relatively simple in construction, inexpensive of manufacture, and very efficient in use.

A further object of my invention is to provide a water flow control fixture having one or more pedally actuated valves, and in the event that two valves are employed in my improved fixture, they may be utilized for controlling the flow of hot and cold water through said fixture.

Further objects of my invention are to provide a fixture of the character referred to that may be readily adjusted to suit different conditions, and a portion of which fixture is equipped with a shampoo attachment that is capable of being shifted into an out-of-way position while not in use.

With the foregoing and other objects in view, my invention consists in certain novel features of construction and arrangement of parts that will hereinafter be more fully described and claimed and illustrated in the accompanying drawings in which—

Fig. 1 is an elevational view of a fixture of my improved construction, the same being shown associated with a stationary wash basin, and with parts thereof in vertical section.

Fig. 2 is an enlarged vertical section taken through the center of a two-way valve and a slip joint forming part of my invention.

Fig. 3 is a detailed section of a spray nozzle that may be detachably applied to the end of the discharge pipe of the fixture.

Fig. 4 is an enlarged front elevational view of the twin valves utilized in connection with my improved fixture, and with one of said valves in vertical section.

Fig. 5 is an enlarged horizontal section taken on the line 5—5 of Fig. 4.

Fig. 6 is a detailed section of a modified form of the valve used in my improved fixture.

Referring by numerals to the accompanying drawings, 10 designates a stationery wash basin, and formed through the plate or slab 11 that extends rearwardly from said basin, is a square or non-circular opening 12, in which is seated the square or non-circular portion of a collar 13, which collar extends a short distance below the plate or slab and the opening through said collar being threaded for the reception of the external threaded upper portion of a tube 14.

By threading the upper portion of the tube 14 in the collar said tube may be adjusted to wash basins of different heights or occupying different horizontal planes, and after such adjustment tube 14 may be locked to collar 13 by a set screw 15.

Positioned on top of the plate or slab 11, is a collar 16 having a flange 17 that rests on top of the plate or slab 11, and the upper end of the threaded portion of tube 14 is seated in the internal lower portion of this collar.

The lower portion of a vertically disposed tube 18 projects downwardly through collar 16 into the upper portion of tube 14, and to lock this tube at any desired elevation a set screw 19 is seated in the upper portion of the collar 16 and bears on tube 18.

Mounted on the upper end of tube 18, is the lower end of a Y or two-way valve housing 20, within which is arranged for rotation a valve 21 having a single port 22 and which valve is manipulated by means of an externally arranged handle 23.

Connected to one of the arms of the two-way valve housing 20 is one end of a forwardly and downwardly curved tube 24, the free end of which is positioned over the rear portion of basin 10, and seated in the other arm of the two-way valve housing 20 is tubular fitting 25.

The lower end of a vertically disposed tube 26 is mounted for rotary movement within the fitting 25, there being a suitable gland or stuffing box 27 arranged between said fitting 25 and tube 26, and the upper portion of said tube is bent outwardly and downwardly to form a gooseneck 28, to the free end of which may be detachably connected in any suitable manner, a flexible tube 29, carrying at its free end a shampoo attachment or spray nozzle such as 30. In order to support the flexible tube 29 a nozzle 30 while not in use, a hook, such as 31, is arranged on the upper portion of the tube 26.

When desired a spray nozzle such as 32 may be detachably applied to the end of tube 24 (see Fig. 3).

The lower portion of tube 14 is firmly held in proper position by means of a suitable brace 33 that is secured to the wall or other suitable support to the rear of the fixture, and from this brace the tube 14 extends forwardly a short distance, and the forward end of said tube is bifurcated as designated by 34 to form a pair of short laterally arranged tubular members that are connected to the upper ends of valve housings 35.

Arranged within the valve housings 35 are downwardly opening spring pressed valves 36, the same being carried by stems 37 that project downwardly through the bottoms of the valve housings 35, and in order to prevent these valve stems and the valves carried thereby from rotating, each valve stem carries a key 38 that occupies a corresponding slot 39, in the lower portion of the valve housing.

Any suitable form of water or fluid flow control valve may be utilized with my improved fixture, but I prefer to use the particular form of self-cushioning valve that forms the subject matter of my co-pending application for U. S. Letters Patent filed July 18, 1927, Serial No. 206,511.

The jointing between the depending valve housing is packed by a suitable gland or stuffing box 38ª, and that portion of the valve stem that extends below this bland or stuffing box is made square or non-circular in order to receive a socket 39ª, having a recess or corresponding shape, and which socket is locked to the depending portion of the valve stem by means of a set screw 40.

Socket 39ª is formed integral with the upper end of a substantially S-shaped arm 41, the lower portion of the latter being formed integral with the rear end of plate 42, that functions as a pedal.

Plate 42 is preferably located directly beneath the valve stem to which the pedal is connected, so that the foot when applied to the pedal exerts downward pressure thereon in direct alignment with the valve stem, thereby eliminating rearward strains or thrusts on the pedal.

Secured to the underside of each pedal 42 is the upper portion of a spring 43, the lower end of which bears on the floor beneath the pedal, such spring yieldingly supports the pedal and assists in returning the same to its normal position when foot pressure is removed from the pedal.

Where two of the valves 35 are utilized in connection with my improved fixture, hot and cold water supply pipes 44 are connected respectively to the valve housings 35, as illustrated in Fig. 1.

If desired, the valves 36 may be formed of suitable metal or composition, or as illustrated in Fig. 6, the lower portion of the valve may consist of a shallow cup-shaped member 45, and said member carrying a disc-shaped body 46, of leather, rubber, or suitable composition.

The valves that control the flow of water through my improved fixture are arranged so that the valve actuating pedals are located immediately adjacent to each other, and as the lower portion of pipe 14 projects forwardly a short distance the pedals are positioned where they may be conveniently reached by the foot, and in operation, the foot may be placed on either pedal, or where it is desired to obtain warm water the foot may be placed on both pedals, as shown by dotted lines in Fig. 4, thereby enabling both valves to be simultaneously opened by pressure of one foot.

Downward pressure of the foot on either one or both pedals draws the corresponding valve stem downwardly, thereby opening the corresponding valve, and water from the supply pipe 44 will pass through the valve housing, thence upwardly through tubes 14 and 18, and passage through tubes 24 or 28, depending on the position of valve 21.

When valve 21 occupies the position as illustrated by solid lines in Fig. 2, water will discharge from pipe 24 into the basin, and when said valve is turned into the position illustrated by dotted lines in Fig. 2 water will pass upward through tube 26 and discharge from the shampoo attachment or spray nozzle carried by the end of flexible tube 29.

The flow of water through the fixture may be very accurately regulated and controlled by pressure of the foot on one or both of the pedals 42, and the downward pressure upon said pedals is yieldingly resisted by the springs 43, and which springs act as equalizers to resist rearward strains upon both pedals.

The keys 38 hold the valves and valve stems against rotation, and as the sockets 39ª on the upper ends of the pedal arms 41 are locked to the non-circular lower ends of the valve stems the pedals will be effectually held against lateral movement in either direction.

During pressure of the foot upon either one or both of the pedals the heel bears on the floor immediately in front of said pedals thereby steadying the foot during pressure, and thus the foot pressure may be conveniently applied to said pedals.

The extension comprising the parts 26, 28 and 29 is of especial advantage where the fixture is installed in barber shops, hair dressing parlors, and the like, and when said extension is not in use it may be turned in either direction so as to occupy an out-ofway position, and which result is made possible by the provision of the slip joint between the parts 25 and 26.

By placing a shampoo attachment or spray nozzle 32 on the end of tube 29 water in the form of spray, and suitable for washing the head, will discharge directly into the basin.

The tube 18 and parts carried thereby may be readily adjusted so as to occupy different elevations by releasing set screw 19 and moving said tube vertically through collar 18 and the upper portion of tube 14, and after such adjustment the parts may be securely locked by tightening said set screw.

If desired, tube 18 may be provided with a number of circumferential grooves 19—a, which receive the inner end of set screw 19, thus providing a positive lock for the tube 18 when the set screw is tightened, and also enabling the tube 18 to be rotated in either direction without moving downward.

The faucet portion of my improved fixture is sustained from a slab, or the like, and is operated from below by a pedal, and no part of the fixture rests on the floor except the spring that is positioned beneath the pedal.

My improved fixture may be readily installed or removed without the necessity for cutting into or destroying any portion of the floor, and said fixture provides a convenient sanitary structure that may be advantageously employed wherever it is desired to control the flow of water or other liquids, and particularly in bath rooms, barber shops, kitchens, and the like.

The collars 13 and 16 provide simple and efficient means for rigidly securing the fixture to the wash basin or slab with which it is associated, and the lower portion of the fixture is firmly held in position by the brace or bracket 33, and the water supply pipes 44 that lead to the valve housings 35.

The water flow control fixture of my improved construction is comparatively simple, is inexpensive of manufacture, may be readily adjusted to suit varying conditions, and the flow of water or other fluids through the fixture is conveniently controlled and regulated by pressure of the foot upon the pedals.

It will be readily understood that minor changes in the size, form and construction of the various parts of my improved fixture may be made and substituted for those herein shown and described without departing from the spirit of my invention. the scope of which is set forth in the appended claims.

I claim as my invention:

1. In a fixture of the class described a wash bowl, a pair of cooperating nuts arranged above and below said wash bowl, a vertically disposed tube adjustably mounted in said nuts, an upright tube mounted for vertical and rotary adjustment in the upper portion of said vertically disposed tube, a pair of branch outlets leading from the upper portion of said adjustable upright tube, a valve for controlling the flow of fluid from said upright tube through said outlets, and a pedally actuated valve for controlling the admission of fluid to the lower end of said first mentioned tube.

2. The combination with a wash basin, or the like, of a vertically disposed tube adjustably mounted on said wash basin, said tube being formed in two parts with the upper part mounted for vertical and rotary adjustment in the upper portion of the lower part, a pair of branch tubes leading from the upper part of said vertically disposed tube, a valve for controlling the flow of fluid from the first mentioned tube through said branch tubes, the upper one of said branch tubes being mounted for rotation and a pedally actuated valve for controlling the admission of fluid to the lower end of said vertically arranged tube.

3. In a fixture of the class described, a pair of telescopically connected tubes adjustably mounted on a support, the upper one of which tubes is mounted for rotary adjustment relative to the other, a pedally actuated valve for controlling the flow of fluid to the lower one of said tubes, a pair of branch tubes connected to and leading from the upper one of said pair of tubes and the upper one of which branch tubes is mounted for rotary movement upon the other.

4. In a fixture of the class described, a pair of telescopically connected tubes adjustably mounted on a support, the upper one of which tubes is mounted for rotary adjustment relative to the other tube, a pedally actuated valve for controlling the flow of fluid to the lower one of said tubes, a pair of branch tubes connected to and leading from the upper one of said pair of tubes, the upper one of which branch tubes is mounted for rotary movement upon the other branch tube and a valve for controlling the flow of fluid to and through said branch tubes.

5. In a fixture of the class described, a pair of telescopically connected tubes the lower one of which is mounted for vertical adjustment in a support, the upper one of said tubes being mounted in the upper portion of the lower tube for rotary movement, a pedally actuated valve for controlling the admission of fluid to the lower portion of the lower one of said tubes, a pair of branch tubes connected to the upper portion of the upper one of said tubes and one of which branch tubes is mounted for swinging movement above the other branch tube.

6. In a fixture of the class described, a pair of telescopically connected tubes the lower one of which is mounted for vertical adjustment in a support, the upper one of said tubes being mounted in the upper portion of the lower tube for rotary movement, a pedally actuated valve for controlling the admission of fluid to the lower portion of the lower one of said tubes, a pair of branch tubes connected to the upper portion of the upper one of said tubes, one of which branch tubes is mounted for swinging movement above the other branch tube, and a valve for controlling the flow of fluid through said branch tubes.

7. The combination with a support of a tube having its upper portion mounted for vertical adjustment in said support, a pedally actuated valve for controlling the admission of fluid to the lower end of said tube, a second tube having its lower portion mounted for vertical and rotary adjustment in the upper portion of the first-mentioned tube, a third tube mounted for rotary movement on the upper portion of the second-mentioned tube, a branch tube leading from the upper portion of the second-mentioned tube, a branch tube leading from the upper portion of the third-mentioned tube, and a valve arranged in the upper portion of the second-mentioned tube for directing flow of fluid thru the first-mentioned branch tube or thru the upper one of the three tubes and its branch tube.

8. In a fixture of the class described, a support, a fluid flow tube adjustably mounted on said support, a valve carried by the lower end of said tube for controlling the flow of fluid thereto, a stem depending from said valve, a substantially S-shaped pedal having its upper end detachably connected to the lower end of said stem and a bow spring secured to and arranged beneath the lower portion of said pedal for yieldingly supporting the same.

9. The combination with a support, of a pair of internally threaded members arranged one above and one below said support, a pair of connected tubes adjustably mounted on said threaded members, one of said tubes being screw seated in said members, the end of the other tube projecting into the end of the threaded tube, each tube being capable of independent adjustment relative to said support, means for independently locking each tube to said support in differently adjusted positions, and a pedally-operated valve connected to the lower end of the lower one of said tubes.

10. The combination with a support, of a pair of internally threaded members arranged one above and one below said support, a pair of connected tubes adjustably mounted on said threaded members, one of said tubes being screw seated in said member, the end of the other tube projecting into the end of the threaded tube, each tube being capable of independentl adjustment relative to said support, means for independently locking each tube to said support in differently adjusted positions, and a pair of independently operable valves connected to the lower end of the lower one of said tubes.

11. The combination with a support and a pair of nuts arranged thereon, of a pair of connected tubes adjustably mounted therein said nuts, each tube being capable of independent adjustment relative to said support, means for independently locking each tube to said support in differently adjusted positions, a pair of independently operable valves connected to the lower end of the lower one of said tubes, and a pair of discharge spouts leading from the upper portion of the upper one of said tubes.

In testimony whereof I affix my signature.
GLENN O. DOUGHERTY.